Figure 11:
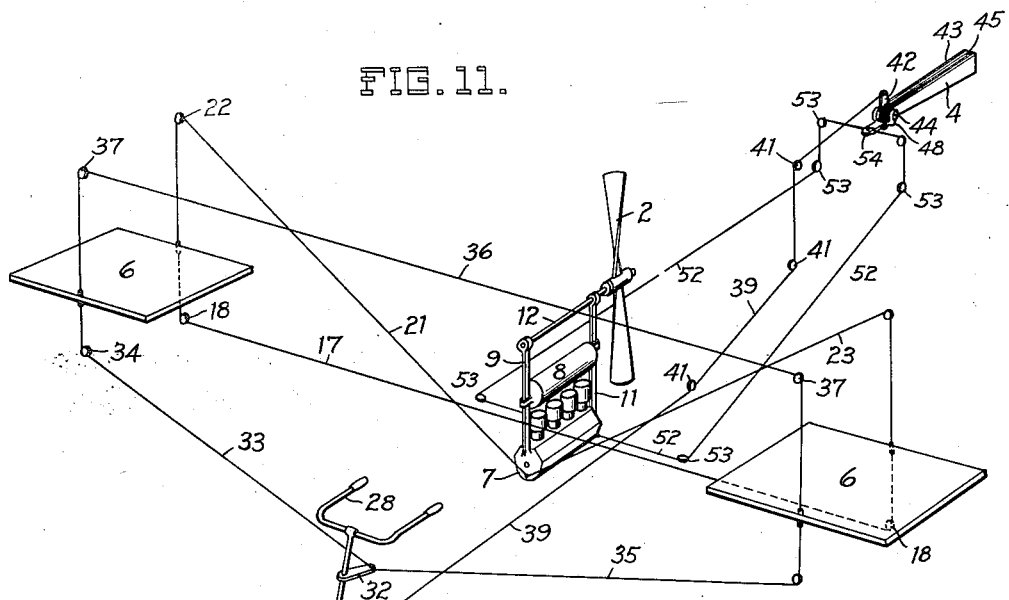

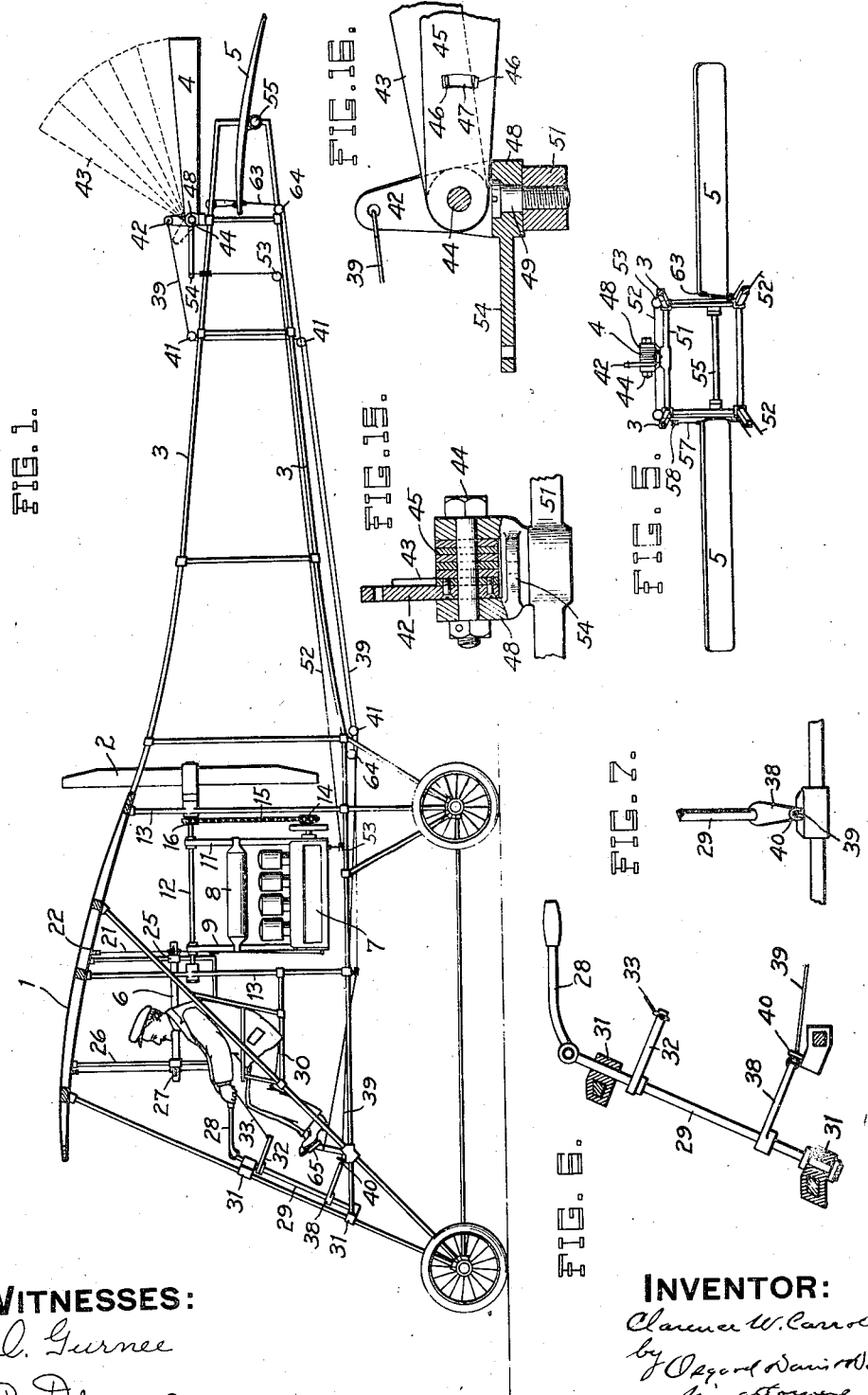

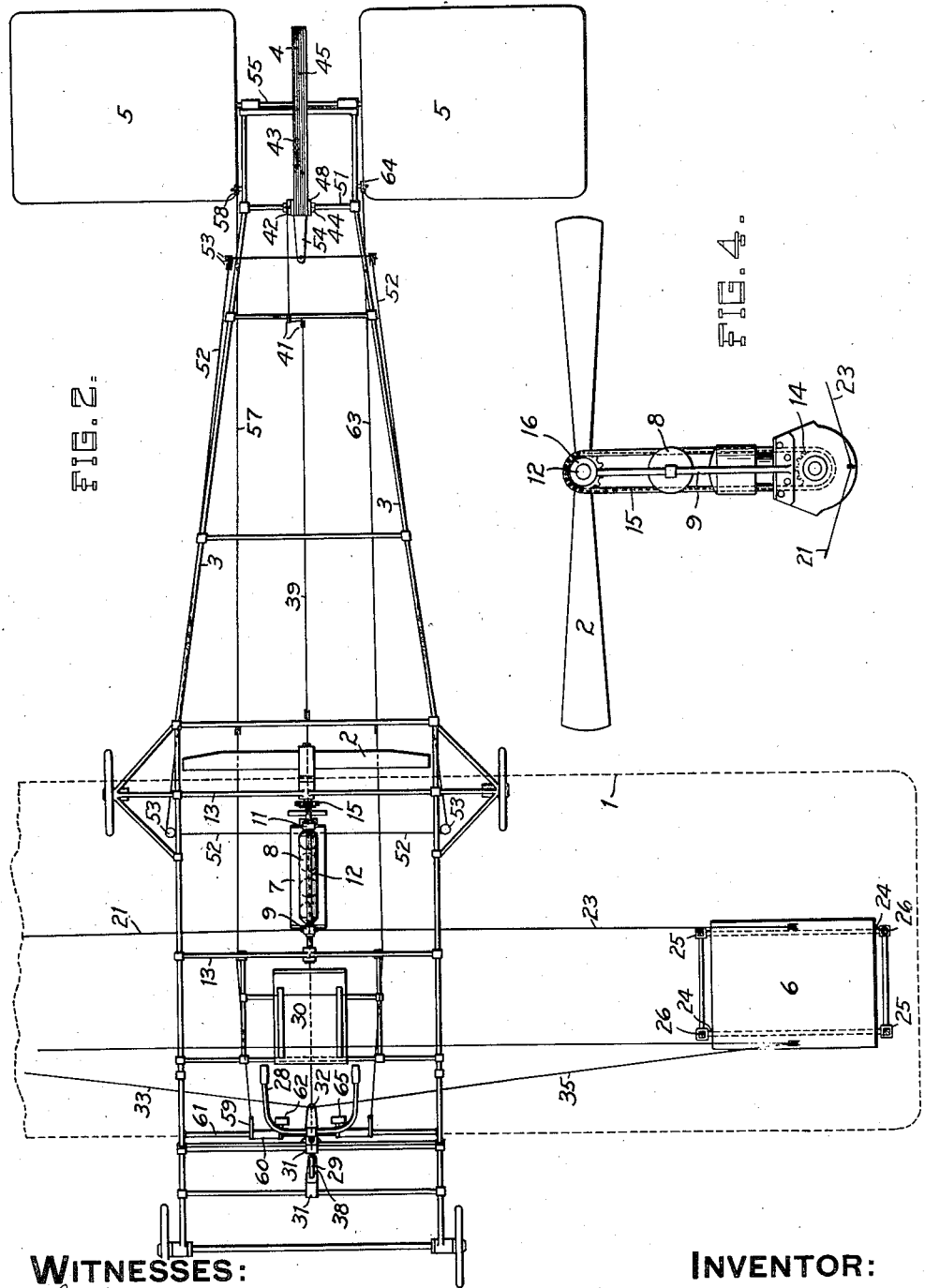

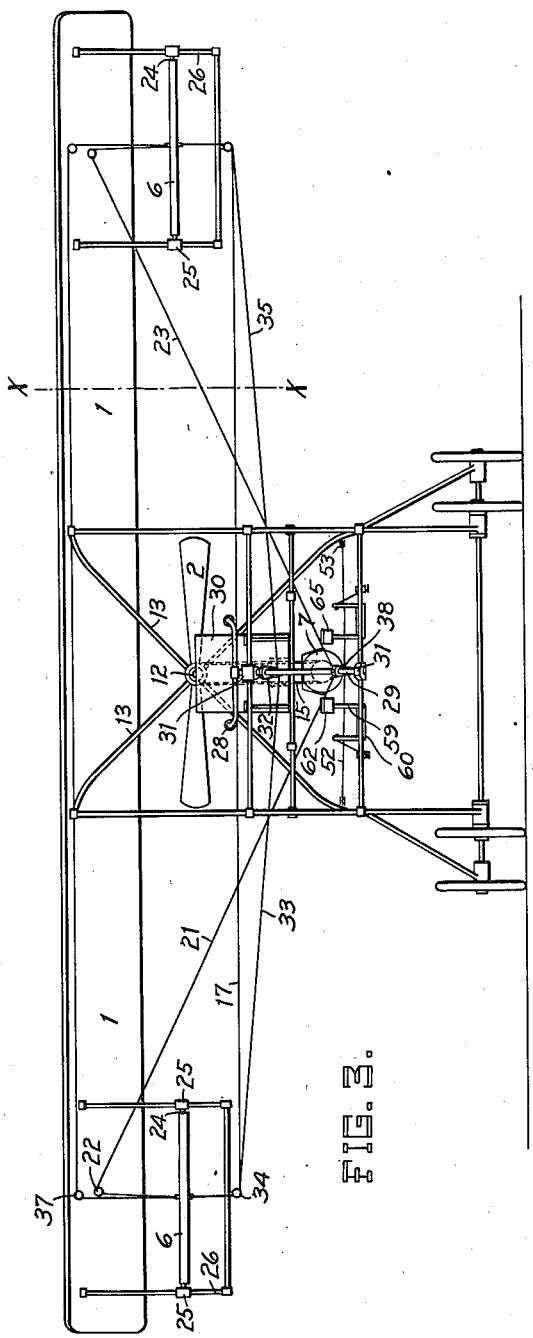

C. W. CARROLL.
AERIAL VEHICLE.
APPLICATION FILED MAR. 12, 1910.

1,174,679.

Patented Mar. 7, 1916.
5 SHEETS—SHEET 4.

WITNESSES:

INVENTOR:
Clarence W. Carroll

C. W. CARROLL.
AERIAL VEHICLE.
APPLICATION FILED MAR. 12, 1910.

1,174,679.

Patented Mar. 7, 1916.
5 SHEETS—SHEET 5.

WITNESSES:
W. Gurnee
B. Dennis

INVENTOR:
Clarence W. Carroll
by Osgood Davis Dory
his attorneys

UNITED STATES PATENT OFFICE.

CLARENCE W. CARROLL, OF ROCHESTER, NEW YORK, ASSIGNOR OF TWO-TENTHS TO FARNUM F. DORSEY AND THREE-TENTHS TO C. SCHUYLER DAVIS, OF ROCHESTER, NEW YORK.

AERIAL VEHICLE.

1,174,679.  Specification of Letters Patent.  Patented Mar. 7, 1916.

Application filed March 12, 1910. Serial No. 549,043.

*To all whom it may concern:*

Be it known that I, CLARENCE W. CARROLL, a citizen of the United States, and resident of Rochester, in the county of Monroe and State of New York, have invented certain new and useful Improvements in Aerial Vehicles, of which the following is a specification.

My invention relates generally to aerial vehicles in which devices of various kinds are employed to control the position in the air, or the direction of movement through the air, of the vehicle, such devices acting either through the reaction of their surfaces with the air resulting from the movement of the vehicle through the air, or in other manners.

In its broadest aspect, my invention is applicable generally either to vehicles of the class commonly designated as "dirigible balloons", or to vehicles designated as "aeroplanes" or "aerostats", or vehicles partaking of the nature of both of these types.

In connection with an aerial vehicle, particularly of the aeroplane type, it has been proposed to use stabilizing devices operating automatically to maintain the vehicle in its normal horizontal position. Under certain conditions, as for example, in turning the vehicle, or in rising or descending, it is necessary or desirable to tilt the vehicle from horizontal position into a somewhat inclined position, for reasons which are well known to those skilled in the art.

One object of the present invention is to provide an aerial vehicle with controlling devices which shall operate normally in an automatic manner to maintain the vehicle in normal position in the air, but which shall also be manually controllable at the will of the operator, to move the vehicle out of normal position, these controlling devices being, therefore, under the joint control of the automatic controlling means, and of the manually-operable controlling means. I employ such an arrangement particularly in connection with the lateral stabilizing devices, that is, the devices by which the vehicle is maintained in a transversely-horizontal position, and arrange them to operate in such a manner that when the vehicle is traveling in a straight path the devices act automatically to maintain the vehicle transversely in horizontal position, while, when the vehicle is to travel in a horizontal curved path, the manually-operable means are used to cause the vehicle to be tilted from such position about its longitudinal axis.

Controlling devices used for directing and stabilizing aerial vehicles may have either an active operation, that is an operation due to actuation of such devices by a suitable source of power in the vehicle whereby they are caused to act upon the air in which the vehicle is suspended, or a passive operation, that is to say, an operation due merely to the reaction of the air against the surface of such devices owing to the movement of the vehicle through the air. Devices operating in the latter manner are hereinafter designated as "reaction" devices, and their operative surfaces as "reaction surfaces". Where a device of this character is normally stationary, so that its operation is purely that of reaction against the air, it may be, and hereinafter is, designated as a "static" reaction device, but it is to be noted that a given surface may have both a reaction effect and an active operation, as, for example, in the case of a wing or plane which is moved vertically by the motor of the vehicle so as to have a propulsive effect while at the same time acting in the manner of an aeroplane, to support the vehicle owing to the reaction of the air through which the vehicle is moving. In most instances, moreover, as, for example, in the case of the well known device commonly designated as an "aileron", the static reaction controlling device while normally stationary, is not immovable, but is adjustable angularly or otherwise to vary the effect upon its reaction surface of the air through which the vehicle is passing.

In a vehicle of the aeroplane type which is not provided with vertical reaction surfaces it has been found necessary, in changing the direction of motion of the vehicle in a horizontal direction, to incline the vehicle transversely in such manner as to cause its supporting reaction surfaces to act not only to support the weight of the vehicle, but also to have a pressure component in the direction to resist the tendency of the vehicle to drift or continue to move in the direction from which it is to be turned. In aeroplanes as heretofore constructed this transverse tilting operation has been performed at the will of the operator, the tilting operation and the horizontal steering operation being coördinated only by the action of the operator in performing two simultaneous operations upon the manually-operable controlling members. One object of the present invention is to automatically insure such tilting operation, so that the vehicle cannot be turned in a horizontal plane until it has been tilted to the requisite degree. To this end I employ a rudder or other steering device which is under the joint control of a manually-operable member and of an automatic mechanism affected by the transverse inclination of the vehicle, the joint operation of both of these devices being required before the rudder or steering device becomes effective to turn the vehicle.

Where a single rotating propeller is used on an aerial vehicle in such constructions as have been heretofore proposed, the reaction of the propeller and its motor have a pronounced tendency to turn the vehicle about its longitudinal axis in a direction opposite to the direction of rotation of the propeller, and this tendency must be opposed by means of the lateral stabilizing device. One object of the present invention is to so arrange the operating mechanism of any aerial vehicle that a single rotary propeller may be used without such effect, and to this end I suspend the propelling mechanism or a portion thereof, including the motor, of my vehicle freely from the body of the vehicle upon a horizontal axis above the center of gravity of such mechanism, so that the motor can swing from its normal vertical suspended position sufficiently to counteract the reaction of the propeller against the air. Since the propelling mechanism including the motor is thus connected with the vehicle body by a simple pivotal connection upon a horizontal axis, it is obvious that no rotative effect can be transmitted to the body of the vehicle through the torque resulting from the reaction of the propeller against the motor. In order to simplify the construction of the power system, and also to increase the stability of the suspended mechanism, I propose also to mount the fuel tank or other motor accessories in the same manner as the motor.

Various devices have been proposed for automatically operating the stabilizing devices of an aerial vehicle, the simplest of such devices being in the form of a pendulum connected with such devices in such manner as to move them from their normal positions in response to the relative movement of the pendulum and the vehicle body, when the latter is tilted from normal horizontal position. I propose to use a construction of this sort, but in order to provide a pendulum of sufficient weight for this purpose without substantially increasing the total weight of the vehicle, I utilize the motor and other parts of the power plant to provide the weight of such pendulum, the motor being pivotally suspended, as above described, so as to constitute a pendulum, and the stabilizing devices being connected with and actuated by this pendulum. In carrying out the double control of the steering device hereinbefore described, I may also utilize this same pendulum as the automatic means for controlling the steering means.

Other features of my invention will be set forth in connection with the following description of the preferred embodiment of the invention.

In the accompanying drawings:—Figure 1 is a side elevation of an aeroplane embodying the present invention, the nearer portion of the main supporting plane and one of the ailerons being removed on the section line X—X, Fig. 3; Fig. 2 is a plan view of the aeroplane of Fig. 1, with the main supporting plane removed to show the parts below; Fig. 3 is a front elevation of the aeroplane; Fig. 4 is a front elevation of the actuating mechanism; Fig. 5 is a front elevation of the horizontal and vertical rudders, and the rear portion of the frame upon which they are supported; Fig. 6 is a side elevation of the manually-operable controlling member, showing in section the frame-members upon which it is mounted; Fig. 7 is a detail view and rear elevation of a part of the manually-operable controlling mechanism; Fig. 8 is a front elevation of one of the ailerons, and the portion of the frame upon which it is mounted; Figs. 9 and 10 are end elevations of the subject-matter of Fig. 8, showing the ailerons in different positions; Figs. 11, 12, 13 and 14 are diagrammatic perspective views of the controlling devices of the aeroplane in various operative positions; Fig. 15 is a vertical transverse section through the pivotal support of the rudder; and Fig. 16 is a vertical longitudinal section of a portion of the rudder. Figs. 1, 2, 3 and 4 are partly diagrammatic in character, since various constructional details, having no bearing upon the present invention, are omitted in order to simplify the illustrations.

The illustrated embodiment of my invention is an aeroplane or aerostat, that is to say, it is supported entirely by the reaction of a main supporting plane 1, having a downwardly-directed, curved static reaction surface. The aeroplane is propelled by means of an ordinary rotary propeller 2, operating in the rear of the main supporting plane. The frame of the vehicle has the usual rear extension 3 to support the vertical static reaction device or rudder 4, and the horizontal rudder 5.

The lateral stability, and the lateral tilting movements of the vehicle are secured by the operation of adjustable static reaction devices of the kind usually designated as ailerons, two ailerons 6 being arranged below, and near the ends of, the main supporting plane.

The propeller 2 is actuated by a motor 7, and both the motor and its accessory devices, such as the fuel tank 8, are fixed to two depending arms 9 and 11, which are pivoted upon the horizontal propeller shaft 12. The shaft 12 is journaled in vertical members 13 of the vehicle frame, and the motor is connected with the propeller shaft by means of a sprocket 14 on the motor shaft, a sprocket-chain 15, and a sprocket 16 on the propeller shaft. This arrangement is such that when the motor drives the propeller the reaction of the motor against the propeller is balanced by a slight lateral displacement or swinging of the motor and accessories upon the arms 9 and 11 from normal vertical position, and at the same time the pendulum, comprising the power plant and the suspending arms, is free to maintain such position regardless of lateral tilting of the vehicle.

The automatic control of the ailerons by the action of the pendulum is secured through cords or wire connected with the pendulum, running around pulleys on the frame of the machine, and connected with the rear edges of the ailerons. A wire 21 connected with the lower end of the pendulum passes around a pulley 22, and thence downward to the rear edge of the right-hand aileron. A wire 23 is similarly connected with the left-hand aileron. The rear edges of the ailerons are also connected beneath by a wire 17, passing around pulleys 18 and thence upward to the edges of the ailerons. This construction is such that, if the vehicle tilts down on one side and up on the other, the aileron on the depressed side is swung downwardly at its rear edge, and the opposite aileron is swung upwardly at its rear edge, this action resulting from the maintenance, by the pendulum of its substantially vertical position, and the resulting tension upon one of the wires 21, 23. The ailerons thus operate automatically to restore the transverse horizontal position of the vehicle.

The construction of the ailerons by which the angular movements thereof are permitted is more particularly illustrated in Figs. 8, 9 and 10. Each aileron is mounted, near its corners, upon horizontal pivots 24, which loosely engage slots 27 in the ends of the aileron. The pivots 24 are fixed in sleeves 25, which are guided vertically upon rods 26 constituting portions of the frame of the vehicle. This construction is such that through the operation of the wires 21, 23 and 17 the rear edges of the aileron are moved up and down, causing an angular movement of the aileron about the forward pivots 24. When the forward edge of the aileron is moved up and down, by means to be presently described, the aileron has an angular movement about the rear pivots 24. Under certain conditions, when both edges of the aileron are moved up and down together, the resulting movement of the aileron is purely vertical, the aileron maintaining its angle with the horizontal position.

The manually-operable controlling member is in the form of a forked hand-lever 28, which is arranged in convenient position in front of the operator's seat 30. The hand-lever is mounted upon an upright stem 29, which is pivoted in bearings 31 on members of the vehicle frame. The hand-lever is arranged to operate directly upon the ailerons, so that when it is swung to one side or the other of its normal position, it operates to tilt the vehicle to one side or the other. To this end an arm 32, fixed to the stem 29 and projecting rearwardly therefrom, is connected, by means of a wire 33 passing under a pulley 34, with the forward edge of the right-hand aileron. A wire 35 connects the arm similarly with the left-hand aileron. This arrangement is such that when the hand-lever is swung to the right the ailerons are moved in such a manner as to tilt the right-hand side of the vehicle upward and the left-hand side downward, and an opposite movement of the hand-lever produces the opposite effect.

While the ultimate purpose of the hand-lever is to direct the course of the vehicle in a horizontal plane through the operation of the vertical rudder 4, the hand-lever does not operate directly upon the rudder in such a manner as to cause it to steer the vehicle, but, on the contrary, the angular movements of the vertical rudder about its vertical axis are produced directly by the automatic pendulum mechanism, while the hand-lever operates directly upon the rudder only in such a manner as to move it from an inoperative position into a position in which it may operate, when moved angularly by the automatic mechanism. To this end a second rearwardly-projecting arm 38 is fixed to the stem 29. A wire 39 connected with the arm 38 passes through an eye 40 on the frame of the machine, and thence around pulleys 41 to an upwardly-projecting arm 42. The arm 42 is fixed to a blade 43, which constitutes one member of the fan-like folding rudder 4. This rudder comprises a number of blades 45 similar to the blade 43, all of which are pivoted at their forward extremity upon a horizontal pivot 44. The terminal blade 43 alone is connected with the wire 39 by means of the lever 42, but each of the blades is provided with a lug 46 engaging a slot 47 in the next adjacent blade.

This construction is such that when the wire 39 is pulled and the arm 42 and blade 43 are swung into the upwardly-inclined position illustrated in dotted lines in Fig. 1, each of the blades 45 is also swung upward by the action of the lugs and slots, so that the rudder opens in the form a fan, and its operative surface is thereby increased to an effective area. When the wire 39 is released the rudder blades fall into closed position, in which the effective area of the rudder is so small as to be negligible.

The connections by which angular movements are imparted to the rudder 4 about its vertical axis comprise two wires 52, which are connected with the pendulum and pass around pulleys 53 to the end of a forwardly-projecting horizontal arm 54. The arm 54 is integral with a yoke 48 in which the pivot 44 is mounted, and this yoke is pivotally mounted upon a vertical stud 49 screwed into a horizontal frame-member 51. This construction is such that when the vehicle is in transversely-horizontal position, and the pendulum hangs in normal substantially-vertical position, the rudder 4 is held in normal position parallel with the axis of the vehicle and has no steering effect. When the vehicle is tilted to one side or the other, the pendulum operates, through one or the other of the wires 52, to swing the rudder 4 about its vertical axis on the stud 49, and thus to render the rudder effective to change the course of the vehicle provided the hand-lever has been moved to open the rudder through the operation of the wire 39.

Figure 12:
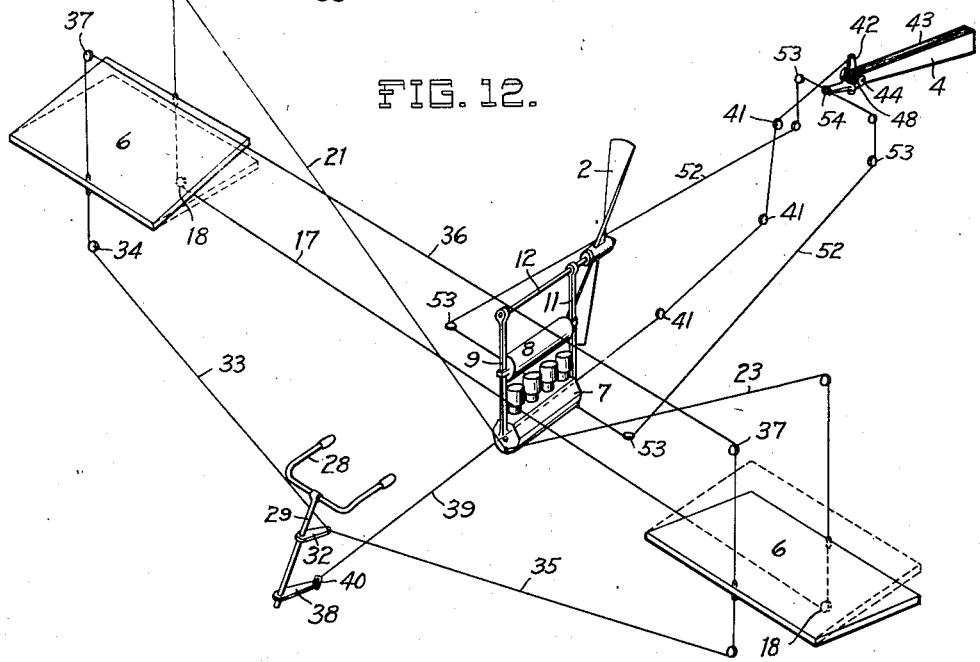

The several operative positions of the controlling devices above described are illustrated in Figs. 11 to 14, inclusive. Fig. 11 shows the parts in their normal position, in which the vehicle is supposed to be proceeding in a straight horizontal course, and in transversely-horizontal position. Fig. 12 shows the effect of a disturbance, such as a puff of wind, which causes the left-hand side of the vehicle to be depressed and the right-hand side to be raised. The pendulum still hangs vertical, and thereby pulls upon the wire 21, so as to raise the rear edge of the right-hand aileron, while the wire 17 acts to depress the rear edge of the left-hand aileron, as shown in full lines in Fig. 12. The ailerons, in this position, immediately act to tilt the vehicle back to transversely-horizontal position. It may be noted that in Fig. 12 the vertical rudder 4 is shown as swung to the left by the same action of the pendulum by which the ailerons are moved as just described. This movement of the rudder has no substantial effect, however, upon the course of the vehicle, since the rudder is in folded position.

Figure 13:
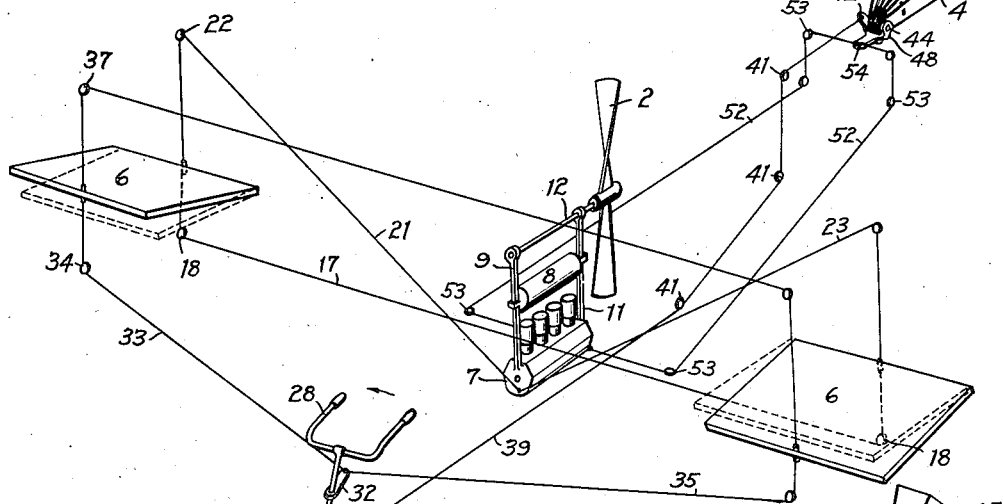
Figure 14:
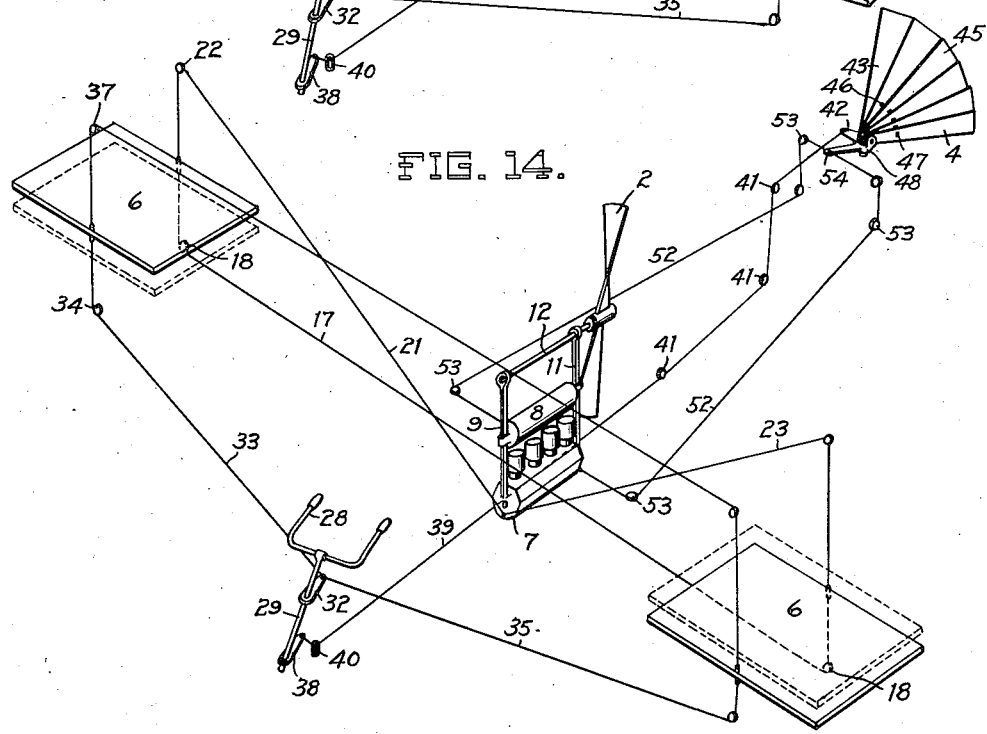

Fig. 13 shows the position assumed by the parts when the hand-lever is swung to the right with the object of steering the vehicle horizontally to the left. The immediate effect of the movement of the hand-lever is to open the vertical rudder, raise the forward edge of the right-hand aileron, and depress the forward edge of the left-hand aileron, through the connections above described. At this time the rudder still remains in normal angular position, however, so that it does not immediately act to change the course of the vehicle. As soon, however, as the ailerons, in the adjusted position above described, act to tilt the left-hand side of the vehicle downward, and the right-hand side upward, and in proportion as such tilting occurs, the relative movement of the vehicle body and the pendulum causes the latter to swing the vertical rudder to the left, and thus to turn the vehicle to the left in proportion as it is tilted. As the vehicle turns in this manner, however, the pendulum also acts to raise the rear edge of the right-hand aileron, and depress the rear edge of the left-hand aileron, so that eventually a position of stability is reached in which the vehicle is tilted to the left, and the rudder is acting to turn the vehicle to the left, while the ailerons are restored to horizontal position, as shown in full lines in Fig. 14. Upon the completion of the desired turning movement the hand-lever is moved to central position. The vertical rudder thereupon folds, and the straight course of the vehicle is resumed. At the same time, a reverse effect upon the ailerons is produced, so that they cause the vehicle to resume its transversely-horizontal position.

It will be noted that even when the hand-lever is moved, and the ailerons are thus moved from their normal angular position to tilt the vehicle, the ailerons are still under the control of the automatic pendulum mechanism, so that the latter is still effective to correct any undue tilting of the vehicle resulting from a puff of wind or other incidental cause. It will also be noted that this arrangement is such that it is impossible, on the one hand, to change the course of the vehicle in a horizontal direction until the vehicle has been properly tilted, and, on the other hand, it is impossible for the pendulum mechanism to change the course of the vehicle without the movement of the hand-lever by the operator.

While the vertical rudder is practically inoperative when in folded condition, it will be noted that in the construction illustrated the rudder, even when folded, has a slight amount of operative surface, so that whenever the vehicle is accidentally tilted from its transverse horizontal position, and the rudder is swung by the operation of the pendulum, the rudder has a slight tendency to change the course of the vehicle. This action is not, however, a detrimental feature in the operation of the device, but tends to insure the safety of the vehicle, since it results in a more effective opposition to serious disturbances in the lateral stability of the machine, such disturbances being opposed not only by the restoring action of the ailerons, but also by the centrifugal action of the vehicle in such slight change in course as may result from the action of the rudder.

While the horizontal rudder 5 may be operated automatically in the same manner as the ailerons 6, I have, for simplicity of operation, shown this rudder as manually controlled. The horizontal rudder comprises two surfaces mounted on opposite ends of a shaft 55 journaled transversely in the rear frame-extension 3. To the forward edge of one member of the rudder is attached a wire 57, which passes around pulleys 58 to the front of the machine where it is connected with a forwardly-projecting arm 59 fixed on a sleeve 60, which is journaled upon a horizontal frame-member 61. The sleeve is provided also with a pedal 62 in convenient position in front of the operator's seat. The forward edge of the lefthand member of the horizontal rudder is connected, by a wire 63 passing around pulleys 64, with a pedal 65 mounted in the same manner as the pedal 62. By means of the mechanism just described the horizontal rudder may be moved angularly in either direction from horizontal position, so that the rear end of the machine may be lifted or depressed, and the inclination of the longitudinal axis of the machine may thus be controlled.

Although I employ, in connection with my vertical rudder, a construction in which the rudder is thrown into and out of operation by a movement by which its effective area is varied, I do not claim this construction and mode of operation as a part of my invention, as it is disclosed and claimed in the co-pending application of Percy W. Hodgkinson, filed of even date with this application, to which reference is made by permission of the inventor.

My invention is not limited to the embodiment hereinbefore described and illustrated in the accompanying drawings, but may be embodied in various forms within the nature of my invention, as it is defined in the succeedings claims.

I claim:

1. An aerial vehicle having, in combination, means for steering the vehicle horizontally, controlling-means coöperating with the steering-means and operative automatically to control the direction of operation thereof, and manually-operable means connected with the steering-means and operable to throw the steering-means into operation in the direction determined by said controlling-means.

2. An aerial vehicle having, in combination, a rudder movable both to vary its effective surface and its angle of incidence, mechanism operating automatically, in accordance with the position of the vehicle, and connected with the rudder to produce one of said movements thereof, and manually-operable mechanism connected with the rudder to produce the other of said movements thereof, whereby the rudder is under the joint control of said mechanisms.

3. An aerial vehicle having, in combination, a lateral stabilizing device, a rudder movable both to vary its effective area and its angle of incidence, mechanism operating automatically in accordance with the position of the vehicle, and connected with the rudder to produce one of the said movements thereof, manually-operable mechanism connected with the rudder to produce the other of said movements thereof, and connections between the lateral stabilizing device and both of said mechanisms to control said device by the joint operation of said mechanisms.

4. An aerial vehicle having, in combination, an adjustable static controlling device mounted for independent transverse movements of its forward and rear edges, respectively, mechanism for moving one of said edges automatically in accordance with the position of the vehicle, and manually-operable means for moving the other of said edges.

5. An aerial vehicle having, in combination, a vertical rudder, manually-operable means for throwing the rudder into operative position, and mechanism controlled by the lateral inclination of the vehicle, connected with the rudder and operating automatically to retain the rudder in a neutral position in which it is inoperative to deflect the vehicle laterally when the vehicle has no substantial lateral inclination, regardless of the operation of the manually-operable means.

6. An aerial vehicle having, in combination, means for steering the vehicle horizontally, means for controlling the lateral inclination of the vehicle, means operating automatically in accordance with the lateral inclination of the vehicle to control the direction of operation of said steering means, and unitary manually-operable means for throwing the steering means into and out of operation, regardless of its direction of operation, and for simultaneously causing the lateral inclination of the vehicle to be altered by said controlling means.

7. An aerial vehicle having, in combination, lateral ailerons, a vertical rudder, a manually-operable member, a member operating automatically in accordance with the lateral inclination of the vehicle, operating connections between both of said members and the ailerons whereby the ailerons are moved to positions which are the resultant of the positions of said two members, and connections between said members and the vertical rudder whereby the rudder is moved to operative position by the conjoint action of said members.

8. An aerial vehicle having, in combination, lateral ailerons, means for steering the vehicle in a horizontal plane, manually-operable means for moving the ailerons and for simultaneously rendering the steering device operative or inoperative; and a member moving automatically in accordance with the lateral inclination of the vehicle and so connected with said steering means that the latter is moved in proportion to said inclination.

9. An aerial vehicle having, in combination, a manually-operable member interconnected with lateral ailerons and with a normally inoperative rudder so that movement of said member causes the ailerons to effect the lateral inclination of the vehicle, and renders the rudder operative for steering the vehicle in a horizontal plane; and a member moving automatically in accordance with the inclination of the vehicle, and connected with the rudder to move it in direct proportion to said inclination.

10. An aerial vehicle having, in combination, a vertical rudder, manually-operable means for throwing the rudder into operative position, and mechanism, controlled by the lateral inclination of the vehicle and connected with the rudder, said mechanism being constructed and arranged to retain the rudder automatically, and notwithstanding the operation of the manually-operable means, in a neutral position, in which it is inoperative to deflect the vehicle from a straight course, so long as the vehicle has no substantial lateral inclination.

CLARENCE W. CARROLL.

Witnesses:
   D. Gurnee,
   L. Thon.